United States Patent [19]

Kawakubo et al.

[11] Patent Number: 4,788,254

[45] Date of Patent: Nov. 29, 1988

[54] CURABLE POLYMER COMPOSITION

[75] Inventors: Fumio Kawakubo; Sadao Yukimoto; Miyako Takanoo; Katsuhiko Isayama; Takahisa Iwahara, all of Kobe, Japan

[73] Assignee: Kanegafuchi Chemical Industry, Co., Ltd., Osaka, Japan

[21] Appl. No.: 75,229

[22] Filed: Jul. 13, 1987

Related U.S. Application Data

[63] Continuation of Ser. No. 758,216, Jul. 23, 1985, abandoned.

[30] Foreign Application Priority Data

Jul. 26, 1984 [JP] Japan ................................ 59-156673
Jul. 26, 1984 [JP] Japan ................................ 59-156674

[51] Int. Cl.$^4$ .............................................. C08F 8/00
[52] U.S. Cl. ........................... 525/100; 525/105; 525/106; 525/446; 528/25; 528/26; 528/29; 528/18; 528/21
[58] Field of Search ............... 528/25, 21, 29, 26, 528/18; 525/404, 446, 100, 105, 106

[56] References Cited

U.S. PATENT DOCUMENTS

| | | | |
|---|---|---|---|
| 3,127,363 | 3/1964 | Nitzsche et al. | 528/15 |
| 3,531,424 | 9/1970 | Swanson | 528/25 |
| 3,565,851 | 2/1971 | Neuroth | 528/29 |
| 3,655,598 | 4/1972 | Antonen et al. | 528/25 |
| 3,692,865 | 9/1972 | Lengick | 528/25 |
| 3,694,478 | 9/1972 | Adams et al. | 528/25 |
| 3,957,683 | 5/1976 | Hittmair et al. | 523/213 |
| 4,111,890 | 9/1978 | Getson et al. | 528/10 |
| 4,242,227 | 12/1980 | Nestrick et al. | 55/67 |
| 4,302,571 | 11/1981 | Arai et al. | 528/32 |
| 4,323,488 | 4/1982 | Takago et al. | 528/25 |
| 4,431,789 | 2/1984 | Okazaki et al. | 528/29 |
| 4,444,974 | 4/1984 | Takase et al. | 528/33 |
| 4,618,653 | 10/1986 | Kawakubo et al. | 525/404 |
| 4,618,656 | 10/1986 | Kawakubo et al. | 525/404 |
| 4,657,986 | 4/1987 | Isayama et al. | 525/100 |
| 4,665,127 | 5/1987 | Hirose et al. | 525/100 |
| 4,689,369 | 8/1987 | Ishino et al. | 525/100 |

OTHER PUBLICATIONS

Eaborn, Organosilicon Compounds, Academic Press, New York, 1960, p. 454.

*Primary Examiner*—Melvyn I. Marquis
*Attorney, Agent, or Firm*—Wegner & Bretschneider

[57] ABSTRACT

A moisture curable polymer composition comprising (A) an organic polymer having at least one reactive silicone group in a molecule and (B) a compound having one silanol group in a molecule and/or a compound which reacts with water or moisture to form a compound having one silanol group in a molecule, which is cured with moisture to give an elastomeric material with improved tensile properties and surface characteristics.

6 Claims, No Drawings

CURABLE POLYMER COMPOSITION

This application is a continuation of U.S. application Ser. No. 758,216 filed July 23, 1985, now abandoned.

FIELD OF THE INVENTION

The present invention relates to a curable polymer composition. More particularly, it relates to a curable polymer composition comprising an organic polymer having at least one reactive silicone group in a molecule and a compound having one silanol group ($\equiv$ SiOH) in a molecule and/or a compound which reacts with water to form a compound having one silanol group in a molecule, which composition is cured with moisture to give an elastomeric material with improved tensile properties and surface characteristics.

BACKGROUND OF THE INVENTION

A moisture curable polymer is a low molecular weight polymer having a functional group cross-linkable with moisture. Before curing, the polymer has such a low molecular weight that it is a liquid at a room temperature and can be poured in a gap, coated on a substrates or shaped in a desired form. Then, it is cross linked and cured with moisture in air to give an elastomeric material. The moisture curable polymer is mainly used as a a sealing material for construction, although it is used as an pressure sensitive adhesive or a molding material.

One of typical moisture curable polmers is a moisture curable polysiloxane having a polysiloxane backbone and at least one reactive silicone group. When it is reacted with water or moisture, a pair of the silicone groups forms a siloxane bond to cure the polymer.

Many moisture curable polymers having a backbone of an organic polymer instead of the polysiloxane have been proposed. Specific examples of such organic polymer are polyoxyalkylene, polyacrylate and the like. Some of such polymers are commercially available. For example, a polymer having a backbone of polyoxypropylene and a methoxysilyl group at its chain end is distributed in a trade name of "MS Polymer" from Kanegafuchi Chemical Industry, Co., Ltd.

Not only the organic polymer having the reactive silicone group is cheaper than the polysiloxane but also the former has many useful properties which are not found in the latter depending on the kind of the backbone organic polymer. However, the organic polymer having the reactive silicone group still has some drawbacks to be overcome.

Since one of the most important properties of the elastomer is elongation, the organic polymer having the reactive silicone group is required to have large elongation. Improvement of elongation of the elastomer is achieved by increasing a chain length between the cross linking sites. Although it is possible to increase the chain length between the reactve silicone groups, some other problems are caused. That is, increase of the molecular weight render the polymer viscous or solid. One example will be shown in below.

Polymethacrylate or polyacrylate having the reactive silicone groups is produced by one of following methods:

1. A method co-polymerizing a monomer having a reactive silicone group such as vinyltrimethoxysilane and $\gamma$-methacryloxypropyltrimethoxysilane.

2. A method utilizing a chain transfer agent such as mercaptosilanes (e.g., $\gamma$-mercaptopropylmethyldimethoxysilane and $\gamma$-mercaptopropyltriethoxysilane) and disulfides having a reactive silicone group e.g, bis-$\gamma$-methyldimethoxysilylpropyldisulfide and bis-$\gamma$-triethoxysilylpropyldisulfide).

3. A method utilizing a pclymerization initiator having a reactive silicone group (e.g., $\alpha,\alpha'$-azobis-5-trimethoxysilyl-2-methyl-valeronitrile).

A polymer produced by one of the above method or by combination of two or more of them has unsatisfactory elongation since, if the produced polymer has a low molecular weight and is liquid at a room temperature, a cross linked polymer has a short chain length between the cross linking sites. Thus, to obtain a cross linked polymer having satisfactory elongation, it is necessary to increase the molecular weight of the polymer so as to increase the chain length between the cross linking sites. Since the high molecular polymer is highly viscous or solid, it should be dissolved in a large amount of a solvent to decrease viscosity of a solution when it is used as a liquid sealing material or an adhesive. However, a solution type sealing material will shrink on evaporation of the solvent or has inferior adhesivity due to the solvent Further, when a solvent type adhesive is coated on a substrate, it takes longer time to evaporate the solvent. In addition, the solvent would cause fire or is harmful to human beings.

According to the conventional methods, it is difficult to produce a moisture curable organic polymer which is a less viscous liquid before curing and cured to give an elastomer with large elongation. In other words, it is difficult to produce a moisture curable polymer which has a low molecular weight before curing and cured to give an elastomer having a long chain length between the cross linking sites.

SUMMARY OF THE INVENTION

One object of the present invention is to provide a moisture curable polymer composition comprising a low molecular weight polymer having at least one reactive silicone group, which is cured to give an elastomeric material having a long chain length between the cross linking sites and thus large elongation.

Another object of the present invention is to provide a moisture curable polymer composition which is advantageously used as a sealing material and an adhesive.

DETAILED DESCRIPTION OF THE INVENTION

According to the present invention, there is provided a moisture curable polymer composition comprising (A) an organic polymer having at least one reactive silicone group in a molecule and (B) a compound having at one silanol group in a molecule and/or a compound which reacts with water or moisture to form a compound having silanol group in a molecule.

When the composition of the present invention is cured with moisture, the reactive silicone group of the polymer (A) may react with the compound having one silanol group in a molecule, so that a part of the reactive silicone groups does not act as cross linking sites but acts as chain propagation sites to increase the chain length.

In addition to the improvement of elongation of the cured product, the composition of the present invention improves tack of the surface of the cured product when used as a sealing material.

A backbone of the organic polymer having at least one reactive silicone group in the molecule may be any one of elastomeric polymeric chain. Specific examples of such polymeric chain are polyether, polyester, ether-ester block copolymer, polybutadiene, styrene-butadiene copolymer, acrylonitrile-butadiene copolymer, acrylate-butadiene copolymer, ethylene-butadiene copolymer, vinylpyridinebutadiene copolymer, ethylene-propylene copolymer, ethylenevinyl acetate copolymer, ethylene-acrylate copolymer, polyisoprene, styrene-isoprene copolymer, isobutylene-isoprene copolymer, polychloroprene, styrene-chloroprene copolymer, acrylonitrile-chloroprene copolymer, polyisobutylene, polyacrylate, polymethacrylate, etc. Among them, polyether, polyester, ether-ester block copolymer, polyacrylate and polymethacrylate are preferable.

The reactive silicone group used herein is intended to mean a group which contains a silicon atom and effects a condensation reaction in the presence of moisture or a cross linking agent and optionally a catalyst. Examples of such group are a group containing silicon atom which bonds to a hydrolyzable group or a silanol group. The reactive silicon group is represented by the formula:

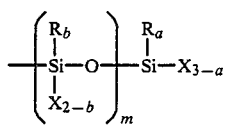

(I)

wherein R is a $C_1$–$C_{20}$ alkyl or cycloalkyl group, a $C_6$–$C_{20}$ aryl group, a $C_7$–$C_{20}$ aralkyl group or a triorganosiloxy group of the formula:

wherein R' is, the same or different, $C_1$–$C_{20}$ monovalent hydrocarbon group, X is a hydroxyl group or, the same or different, a hydrolyzable group, a is 0, 1, 2 or 3, b is 0, 1 or 2, and m is an integer of 0 to 18. Specific examples of the group R are methyl, ethyl, cyclohexyl, phenyl, benzyl, etc. The hydrolyzable group X is, for example, a halogen atom (e.g., fluorine, chlorine, bromine and iodine), a group of the formula: —OZ (in which Z is a $C_1$–$C_{18}$ alkenyl group, a saturated or unsaturated hydrocarbon group, a halogented hydrocarbon group, an acyl group or an N,N-amino group), an amino group, a ketoxime group of the formula: —ON=CR''$_2$ (in which R'' is a $C_1$–$C_{12}$ monovalent hydrocarbon group) or of the formula: —ON=CR''' (in which R''' is a $C_1$–$C_{12}$ divalent hydrocarbon group) and an amide group of the formula: —NR''COR'''' (in which R'' is the same as defined above and R'''' is a $C_1$–$C_{18}$ hydrocarbon group). Among the above hydrolyzable groups, alkoxy groups such as a methoxy group and an ethoxy group are preferable due to their good handling properties.

The organic polymer having at least one reactive silicone group in a molecule is prepared by one of methods described in, for example, U.S. Pat. Nos. 3,592,795 and 3,408,321, Japanese Patent Publication Nos. 36319/1970, 12154/1971 and 32673/1974 and Japanese Patent Kokai Publication (unexamined) Nos. 156599/1975, 73561/1976, 6096/1979, 13767/1980, 13768/1980, 82123/1980, 123620/1980, 125121/1980, 131021/1980, 131022/1980, 135135/1980 and 137129/1980.

For example, the organic polymer having at least one reactive silicone group is prepared by addition polymerization, which comprises polymerizing (a) an ethylenically unsatureted monomer a polymer produced from which is elastomeric in the presence of at least one compound selected from the group consisting of (b) an ethylenically unsaturated monomer having a reactive silicone group, (c) a polymerization initiator having a reactive silicone group and (d) a chain transfer agent having a reactive silicone group.

When the monomer (a) is polymerized in the presence of the monomer (b), a vinyl polymer having the reactive silicone groups in the molecule is produced. However, by this procedure, it is difficult to control the position of the reactive silicone group in the molecular chain. When the monomer (a) is polymerized in the presence of the initiator (c) or the chain transfer agent (d), a polymer having the reactive silicone group at its chain end is produced. Although the chain length between the reactive silicone groups is controlled, molecules having at least two reactive silicone groups are obtained in a small amount. Thus, when the monomer (a) is polymerized in the presence of the monomer (b) and the initiator (c), or the monomer (b) and the chain transfer agent (d), or the initiator (c) and the chain transfer agent (d), a preferable polymer is produced.

Further, when a monomer having two independent ethylenically unsaturated bonds (e) is copolymerized with the monomer (a) in the presence of the initiator (c) or the chain transfer agent (d), a preferable polymer is also produced.

Specific examples of the monomer (a) are butadiene, isoprene, chloroprene, isobutylene, acrylate, methacrylate, mixtures of butadiene with styrene, acrylonitrile, acrylate, ethylene or vinylpyridine, mixtures of isoprene with styrene or isobutylene, mixtures of chloroprene with styrene or acrylonitrile, a mixture of ethylene and propylene, a mixture of ethylene and vinyl acetate, a mixture of ethylene and acrylate, etc. Among them, acrylate an methacrylate are preferablered since their polymers afford a sealing material or an adhesive having good resistance against light, weather and heat and good durability.

The acrylate or methacrylate monomer (hereinafter referred to as "(meth)acrylate") may be represented by the formula:

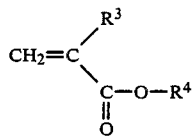

(II)

wherein $R^3$ is a hydrogen atom or a methyl group and $R^4$ is a $C_1$–$C_{20}$ alkyl group. The alkyl group may be straight or branched and unsubstituted or substituted with, for example, a hydroxyl group, an aryl group or a heterocyclic group. Specific examples of the alkyl group are methyl, ethyl, propyl, n-butyl, isobutyl, 1-ethylpropyl, 1-methylpentyl, 2-methylpentyl, 3-methylpentyl, 1-ethylbutyl, 2-ethylbutyl, isooctyl, 3,5,5-trimethylhexyl, 2-ethylhexyl, decyl, dodecyl, 2-hydroxyethyl, 2-hydroxypropyl, diaminoethyl, diethylaminoethyl, glycidyl, tetrahydrofurfuryl, benzyl, etc., and preferably n-butyl and 2-ethylhexyl.

A part of the (meth)acrylate monomer may be replaced with other copolymerizable monomer, for example, styrene or its derivatives (e.g., α-methylstyrene, vinyltoluene, 2-chlorostyrene, etc.), vinyl ethers (e.g., ethyl vinyl ether, isobutyl vinyl ether, 2-ethylhexyl vinyl ether, etc.), (meth)acrylic compounds optionally having a carboxyl group, a hydroxyl group, an epoxy group, an amino group or an amide group (e.g., (meth)acrylic acid, 2-hydroxyethyl (meth)acrylate, glycidyl (meth)acrylate, N-methylaminoethyl (meth)acrylate, acrylamide, N-methylolacrylamide, etc.), $C_2$–$C_{30}$ vinyl monomers (e.g., maleic anhydride, vinyl cinnamate, vinylpyridine, (meth)acrylonitrile, ethylene, propylene, vinyl chloride, vinylidene chloride, vinyl acetate, butadiene, chloroprene, etc.). These monomers may be use as such or as their mixture. The amount of other monomer is preferably less than 50% by weight of the total weight of the monomers because when the amount of other monomer is 50% by weight or more, weather resistance and durability of the cured product are deteriorated.

The ethylenically unsaturated monomer (b) is copolymerized with the monomer (a) so as to provide the organic polymer with the reactive silicone group. The monomer (b) may be any compound that has an ethylenically unsaturated group and a silicon atom to which a hydrolyzable group is bonded in the molecule and preferably a compound of the formula:

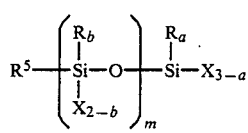   (III)

wherein R, X, a, b and m are the same as defined above and $R^5$ is an organic group having an ethylenically unsaturated group. The ethylenically unsaturated group R5 includes groups of the formulas:

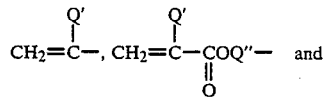 and

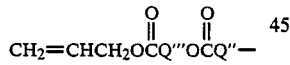

wherein Q' is an hydrogen or a methyl group, and Q" and Q'" are, the same or different, a $C_1$–$C_{18}$ divalent hydrocarbon group, for example methylene, ethylene, propylene, butylene, hexylene, phenylene and cyclohexylene.

Specific examples of the ethylenically unsaturated compound (III) are as follows:

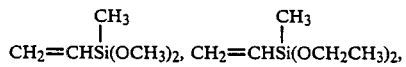

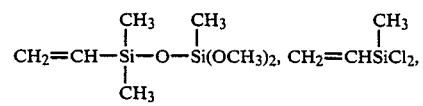

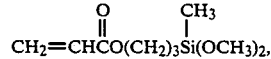

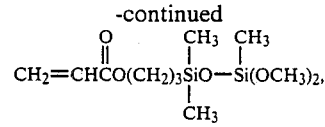

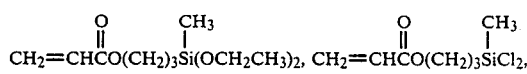

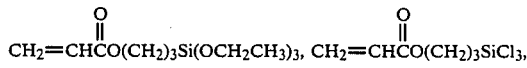

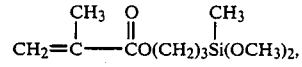

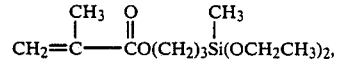

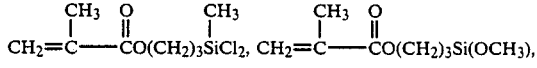

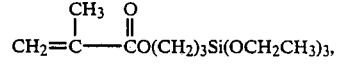

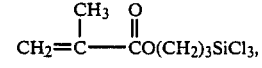

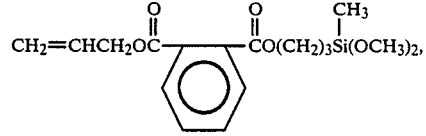

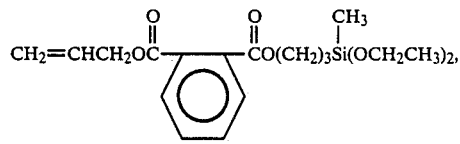

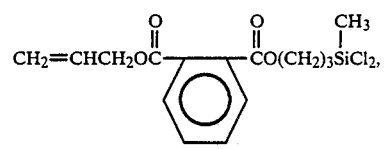

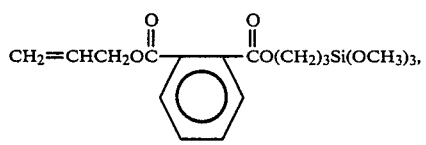

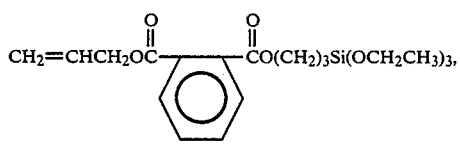

 Among them,

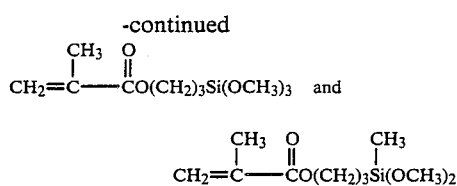

are preferable.

The amount of the monomer (b) is usually form 0.01 to 20 parts by weight based on 100 parts by weight of the monomer (a), particularly less than 0.05 mole per mole of the monomer (a). In some applications, the monomer (b) is not used. When the amount of the monomer (b) is larger than 20 parts by weight based on the 100 parts by weight of the monomer (a), elongation of the cured product of the composition of the invention is not satisfactorily improved.

The polymerization initiator (c) having the reactive silicon group introduces such group in the organic polymer at is chain end and may be an azo or peroxide type iniator. Specific examples of the initiator (c) are radical initiators of the formula:

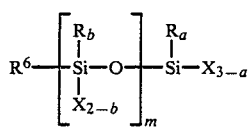

(IV)

wherein R, X, a, b and m are the same as defined above and R⁶ is an organic group containing an azo or peroxy group. Among them, preferable are azo type initiators of the formula:

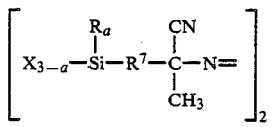

(V)

wherein R and a are the same as defined above and R⁷ is a C₂–C₁₈ divalent hydrocarbon group. Specific examples of the azo compound are as follows:

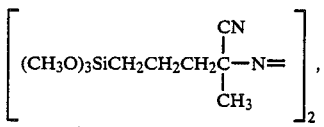

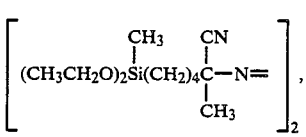

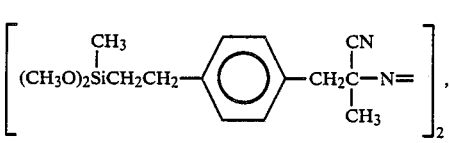

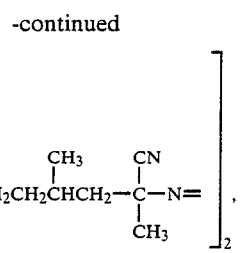

azobis-2-(6-methyldimethoxysilyl-2-cyanohexane), azobis-2-(6-trimethoxysilyl-2-cyanohexane), azobis-2-(6-methyldiacetoxysilyl-2-cyanohexane), etc.

Specific examples of the peroxide type radical initiator are as follows:

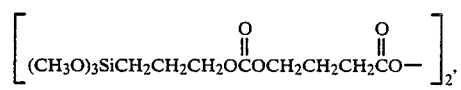

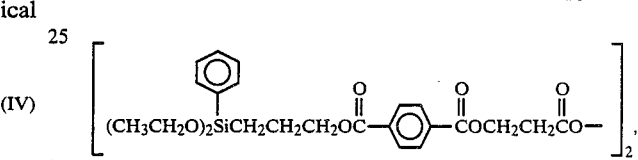

etc.

The amount of the radical polymerization initiator having the reactive silicone group is preferably from 0.01 to 20 parts by weight, specifically from 0.5 to 10 parts by weight based on 100 parts by weight of the monomer (a). The polymerization initiator (c) may be used togerher with other polymerization initiator not having the reactive silicone group. Further, in some cases, the polymerization may be initiated by other initiator not having the reactive silicone group alone.

Preferable chain transfer agent having the reactive silicone group may be represented by the formulas:

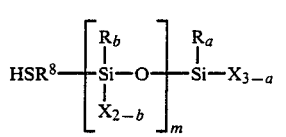

(VI)

wherein R, X, a, b and m are the same as defined above and R⁸ is a divalent organic group, and

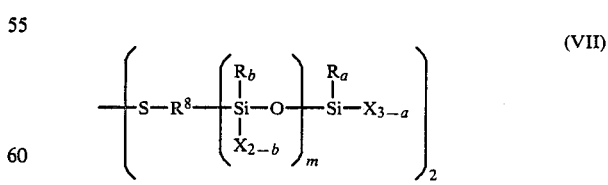

(VII)

wherein R, R⁸, X, a, b and m are the same as defined above. R⁸ is preferably a C₁–C₁₈ divalent hydrocarbon group, for example, methylene, ethylene, propylene, butylene, hexylene, phenylene and cyclohexylene. Specific examples of the chain transfer agent are as follows:

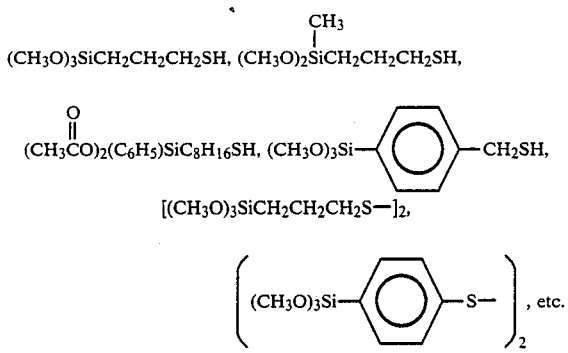

The amount of the chain transfer agent having the reactive silicone group is preferably from 0.01 to 20 parts by weight, specifically from 0.05 to 10 parts by weight based on 100 parts by weight of the monomer (a). When the amount of the chain transfer agent is more than 20 parts by weight based on the 100 parts by weight of the monomer (a), the molecular weight of the produced polymer is too small. In some cases, the chain transfer agent having the reactive silicone group may be used together with a chain transfer agent not having the reactive silicone group or the latter is used alone.

Examples of the compound having at least two independent ethylenically unsaturated groups in a molecule (e) are neopentylglycol diacrylate and dimethacrylate, 1,5-pentanediol diacrylate and dimethacrylate, 1,6-hexanediol diacrylate and dimethacrylate, polyethyleneglycol diacrylate and dimethacrylate, polypropyleneglycol diacrylate and dimethacrylate, divinylbenzene, silicone compounds having at least two ethylenically unsaturated groups in the molecule which may be used as starting materials of so-called addition type silicons, such as

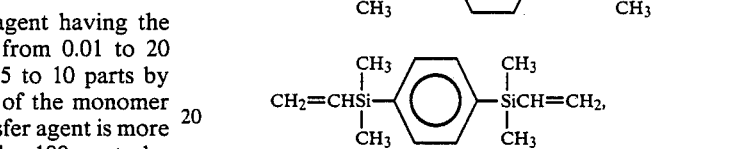

a dimethacrylate ester of polybutadiene having terminal hydroxyl groups (e.g. NISSO-PB (trade name) TE2000 manufactured by Nippon Soda), a reaction product of polyfunctional epoxy compound with an equimolar amount of acrylic or methacrylic acid such as

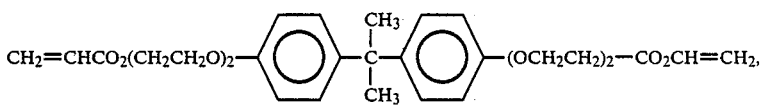

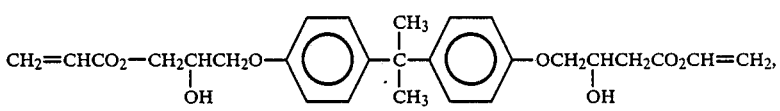

a reaction product of polyester having a terminal hydroxyl group with an equimolar amount of acrylic or methacrylic acid such as

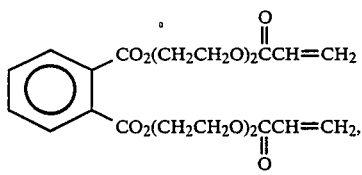

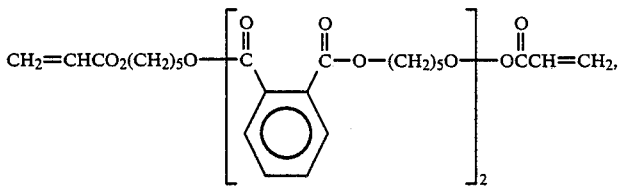

a reaction product of polyurethane having terminal hydroxyl groups with acrylic or methacrylic acid in an equimolar amount with the terminal hydroxyl groups, diallyl o-phthalate and isophthalate, allyl acrylate and methacrylate, methylenebisacrylamide,

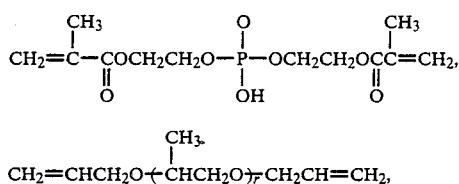

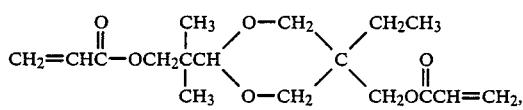

wherein r is an integer of 1 to 50,

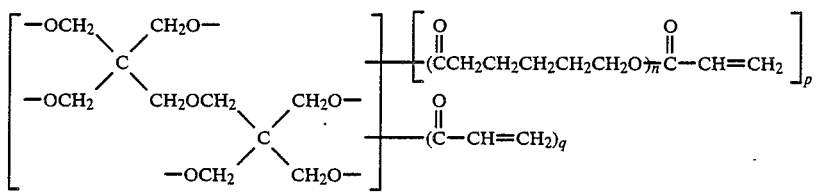

(cf. Japanese Patent Kokai Publication Nos. 13496/1975, 149797/1975, 136583/1978 and 13768/1980), trimethylolpropane triacrylate and methacrylate, pentaerythritol acrylate and methacrylate, triacrylate and trimethacrylate of tris(2-hydroxyethyl)isocyanuric acid, trially cyanurate, tetramethylolmethane tetraacrylate and tetramethacrylate,

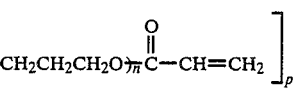

(Trade name:
DPCA-20 (n=1, p=2, q=4)
DPCA-30 (n=1, p=3, q=3)
DPCA-60 (n=1, p=6, q=0)
DPCA-120 (n=2, p=6, q=0)
manufactured by Nippon Kayaku), diallyl phthalate polymer (e.g. Daisodap L (trade name) manufactured by Osaka Soda), polybutadiene-1,2 (NISSO-PB (trade name) manfactured by Nippon Soda), etc.

The polymerization can be carried out in a conventional manner. For example, the polymerization may be initiated by a radical initiator other than the above described radical initiator having the reactive silicone group, or by irradiation with ultraviolet, X-ray or gammaray. Examples of other radical initiator are peroxides (e.g. benzoyl peroxide, benzoyl hydroperoxide, di-t-butyl peroxide, di-t-butyl hydroperoxide, acetyl peroxide, lauroyl peroxide, hydrogen peroxide, etc.), azo compounds (e.g. azobisisobutyronitrile, etc.) and peroxide compounds (e.g. persulfuric acid, diisopropyl peroxydicarbonate, etc.).

The polymerization may be carried out in a solvent which is preferably inactive with the ethylenically unsaturated monomer as well as the organic polymer having the reactive silicone group. Specific examples of the solvent are ethers (e.g. diethyl ether, methyl ethyl ether, methylcellosolve, etc.), hydrocarbons (e.g. pentane, hexane, heptane, etc.), acetates (e.g. methyl acetate, ethyl acetate, butyl acetate, etc.), etc.

The polymerization temperature is not critical in the invention. When the polymerization is initiated by the initiator, it depends on the kind of the initiator, and preferably from 50 to 150° C.

In addition to the chain transfer agent having the reactive silicone group, other chain transfer agent such as thiol compounds (e.g. 1-butanethiol, 1-hexanethiol, 1-dodecanethiol, etc.), disulfide compounds (e.g. ethyldisulfide, phenyldisulfide, butyldisulfide, etc.), halogenated compounds (e.g. chloroform, carbon tetrachloride, carbon tetrabromide, etc.), amine compounds (e.g. triethylamine, tripropylamine, tributylamine, etc.), lower alcohols (e.g. ethanol, isopropanol, butanol., etc.) may be used to conrrol the polymerization degree. The ethylenically unsaturated monomer may be added in one portion, or portionwise or continuously to the polymerization system to control reaction heat.

The organic polymer prepared according to the above described method has at least one reactive silicone group at the chain end or any position of the backbone chain. Preferably, it has, on the average, 1.2 to 3.5 reactive silicone groups in a molecule so as to effectively achieve the object of the present invention. The average molecular weight of the polymer is preferably from 1,000 to 100,000, and specifically from 3,000 to 50,000 when the composition of the invention is used as the sealing material.

Another method for producing the organic polymer having the reactive silicone group comprises firstly producing a backbone polymer and then introducing the reactive silicone group in the polymer. This method will be hereinafter explained by making reference to a polymer of alkyleneoxide as the backbone polymer.

In one example of this method, the organic polymer having the reactive silicone group is prepared by reacting, according to a so-called hydrosilylation reaction, a hydrogenated silicone compound of the formula:

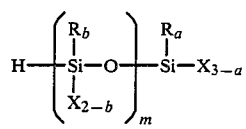

(VIII)

wherein R, X, a, b and m are the same as defined above and a polyalkyleneoxide having an ethylenically unsaturated group of the formula:

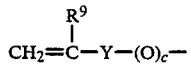

(IX)

wherein Y is a $C_1$–$C_{40}$ divalent group, $R^9$ is a hydrogen atom or a substituted or unsubstituted $C_1$–$C_{20}$ organic monovalent group, and c is 0 or 1 in the presence of a platinum catalyst (e.g. chloroplatinic acid, etc.)

Other examples of methods for preparing the organic polymer having the reactive silicone group are as follows:

(1) Polyisocyanate compound such as toluenediisocyanate is reacted with polyalkyleneoxide having terminal hydroxyl groups to produce polyalkyleneoxide having terminal isocyanate groups, which are subsequently reacted with an active hydrogen-containing group W of a silicone compound of the formula:

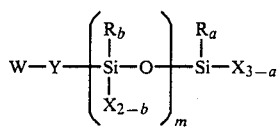 (X)

wherein W is an active hydrogen-containing group selected from the group consisting of a hydroxyl group, a carboxyl group, a mercapto group and a primary or secondary amino group, and R, X, Y, a, b and m are the same as defined above.

(2) The ethylenically unsaturated group (IX) of the polyalkyleneoxide is reacted with the mercapto group of the silicone compound (X) wherein W is the mercapro group.

(3) The terminal hydroxyl group of the polyalkyleneoxide is reacted with a compound of the formula:

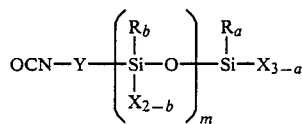 (XI)

wherein R, X, Y, a, b and m are the same as defined above. The present invention is not limited to the above methods.

Specific examples of the hydrogenated silicone compound (IX) are halogenated silanes (e.g. trichlorosilane, methyldichlorosilane, dimethylchlorosilane, trimethylsiloxydichlorosilane, etc.), alkoxysilanes (e.g. trimethoxysilane, triethoxysilane, methyldimethoxysilane, methyldiethoxysilane, phenyldimethoxysilane, 1,3,3,5,5,7,7-heptamethyl-1,1-dimethoxytetrasiloxane, etc.), acyloxysilanes (e.g. methyldiacetoxysilane, trimethylsiloxymethylacetoxysilane, etc.), ketoximatesilanes (e.g. bis(dimethylketoxime)methylsilane, bis(cyclohexylketoxime)methylsilane, bis(diethylketoximate)trimethylsiloxysilane, etc.), hydrosilanes (e.g. dimethylsilane, trimethylsiloxymethylsilane, 1,1-dimethyl-2,2-dimethyldisiloxane, etc.), and alkenyloxysilanes (e.g. methyldi(isopropenyloxy)silane, etc.).

In the reaction of the hydrogenated silicone compound (VIII) and the polyalkyleneoxide having the group (IX), a part or all of X groups may be converted to other hydrolyzable group(s) or a hydroxyl group(s). For example, when X is halogen atom or the hydride group, it is preferably converted to a alkoxy group, an acyloxy group, an aminoxy group, an alkenyloxy group, a hydroxyl group, etc. In the group (IX), $R^9$ is preferably a hydrogen atom or a hydrocarbon group, particularly a hydrogen group. Y is preferably a $C_1$-$C_{20}$ organic divalent group, particularly —$R^{10}$—, —$R^{10}$—O—$R^{10}$—, —$R^{10}$—O—CO— and —$R^{10}$—CO— (in which $R^{10}$ is, the same or different, a $C_1$-$C_{20}$ divalent hydrocarbon group, especially a methylene group.

The polyalkyleneoxide having the group (IX) may be prepared by a method disclosed in Japanese Patent Kokai Publication (unexamined) No. 6097/1979 or a method comprising introducing the ethylenically unsaturated group by copolymerizing an epoxy compound (e.g. ethyleneoxide, propyleneoxide, etc.) with an epoxy compound having an ethylenically unsaturated group (e.g. allyl glycidyl ether, etc.).

The main chain of the polyalkyleneoxide to be used in the invention preferably comprises repeating units of the formula:

—$R^{11}$—O— wherein $R^{11}$ is a $C_1$-$C_8$ organic divalent group, specifically most of $R^{11}$ are $C_1$-$C_4$ hydrocarbon groups Specific examples of $R^{11}$ are —$CH_2$—, —$CH_2CH_2$—, —$CH(CH_3)CH_2$—, —$CH(C_2H_5)CH_2$—, —$C(CH_3)_2CH_2$—, —$CH_2CH_2CH_2CH_2$—, etc. Among them, —$CH(CH_3)CH_2$— is most preferable. The main chain of the polyalkyleneoxide may comprise one or more kinds of the repeating units. The molecular weight of the polyalkyleneoxide is preferably from 500 to 30,000, specifically from 3,000 to 15,000.

The polyalkyleneoxide having the reactive silicone group may be used alone or a mixture of two or more kinds of them. In addition, a mixture containing 50% by weight or more of the polymer may be used.

Furthermore, a polymer produced by graft polymerizing a vinyl monomer in the presence of the above described organic polymer may be used. Such the grafted organic polymer is disclosed in Japanese Patent Kokai Publication (unexamined) No. 78228/1984, Japanese patent publication Nos. 84848/1984 and 84849/1984 and produced by graft polymerizing at least one vinyl monomer selected from the group consisting of the compounds of the formulas (XII) and (III) on the above described organic polymer.

Together with the monomer (a), a small amount of other ethylenically unsaturated monomer may be used. Such other ethylenically unsaturated monomer may be represented by the formula:

 (XII)

wherein $R^1$ is a hydrogen atom, a halogen atom or a substitute or unsubstituted $C_1$-$C_{10}$ aliphatic hydrocarbon group, and $R^2$ is a hydrogen atom, a halogen atom, a substitute or unsubstituted $C_1$-$C_{10}$ aliphatic hydrocarbon group, a substituted or unsubstituted monovalent aromatic hydrocarbon group, an alkenyl group, a carboxyl group, acyloxy group, an to alkoxycarbonyl group, a nitrile group, pyridyl group, an amide group or a glycidoxy group. As the organic polymer on which the vinyl monomer is grafted, polyalkyleneoxide, particularly polypropyleneoxide is preferable. Specific examples of the ethylenically unsaturated monomer (XII) are ethylene, propylene, isobutylene, butadiene, chloroprene, vinyl chloride, vinylidene chloride, acrylic acid, methacrylic acid, vinyl acetate, acrylonitrile, vinyl pyridine, styrene, chlrostyrene, 2-methylstyrene, methyl acrylate, ethyl acrylate, isobutyl acrylate, 2-ethylhexyl acrylate, 2-hydroxyethyl acrylate, benzyl acrylate, glycidyl acrylate, methyl methacrylate, ethyl methacrylate, isobutyl methacrylate, 2-ethylhexyl methacrylate, 2-hydroxyethyl methacrylate, benzyl methacrylate, glycidyl methacrylate, acrylamide, methacrylamide, n-methylolacrylamide, etc. Among them, the (meth)acrylate monomer (II) is preferably used when the compound is used as the sealing material or the adhesive. The polymerization conditions are substantially the same those employed in the addition polymerization of the vinyl monomer.

As the compound having one silanol group in a molecule, any compound having a silanol group may be used. Specific examples of such compound are a compound having a general formula: $(R^{12})_3SiOH$ wherein $R^{12}$ is, the same or different, a substituted or unsubstitute alkyl or aryl group (e.g., $(CH_3)_3SiOH$, $(CH_3CH_2)_3—SiOH$, $(CH_3CH_2CH_2)_3SiOH$, n-$Bu_3SiOH$, (sec-$Bu)_3SiOH$, (ter-$Bu)_3SiOH$, $(C_5H_{11})_3SiOH$, $(C_6H_{13})_3SiOH$

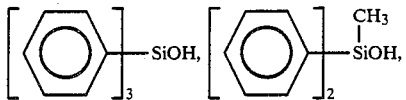

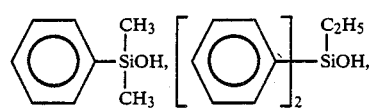

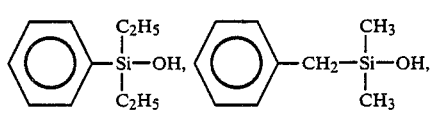

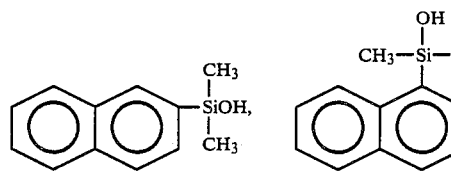

cyclic polysiloxane compound having the silanol group

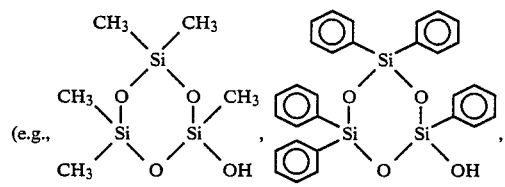

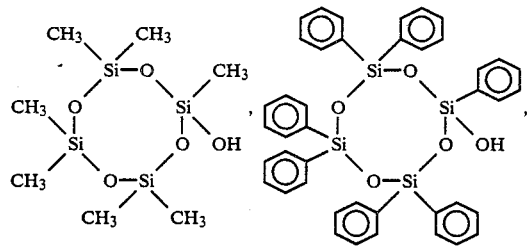

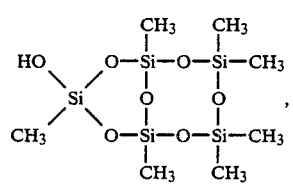

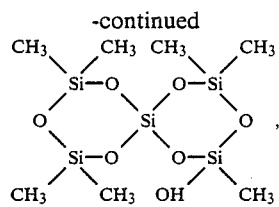

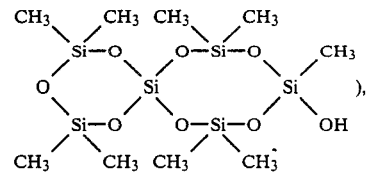

an acyclic polysiloxane compound having the silanol group

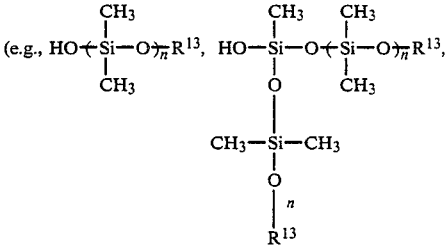

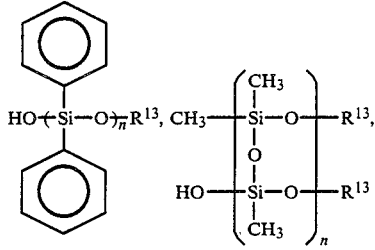

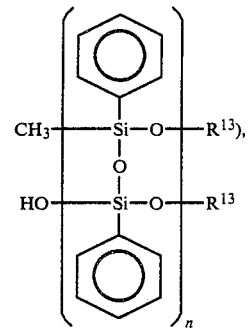

wherein n is an integer of 1 to 100 and $R^{13}$ is $C_1$-$C_{20}$ monovalent organic group, a compound having a backbone chain consisting of silicon, carbon and oxygen atoms and a terminal silanol group

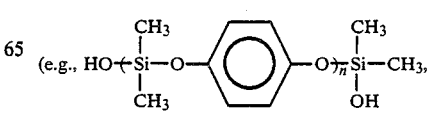

-continued

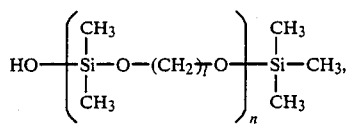

wherein n is an integer of 0 to 20 and I is an itneger of 1 to 20).

As the content of the silanol group increases, the effect of the compound increases if the amount of the compound to be added is the same. Thus, (CH$_3$)$_3$SiOH and (CH$_3$CH$_2$)$_3$SiOH are preferable. In view of handling and stability in air,

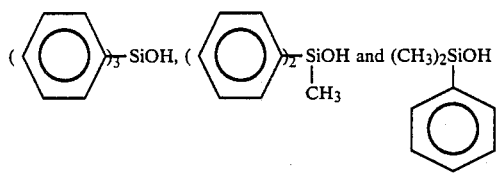

are preferable.

As the compound which reacts with water to form the compound having one silanol group in a molecule, so-called a sililating agent is also used. When such compound is used, the composition of the present invention can be suitably used as a mastic type sealant The mastic type sealant is a composition in which only the surface of the composition is cured and a tack free surface is formed while the inner portion thereof is not sufficiently cured and remains in a semi-cured state. Especially, the compound having Si-N linkage such as (CH$_3$)$_3$SiNHSi(CH$_3$)$_3$ is preferable for the mastic type sealant composition. Specific examples of the compound which forms the silanol compound are

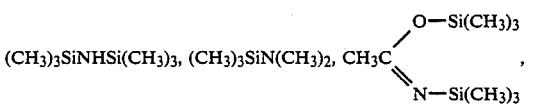

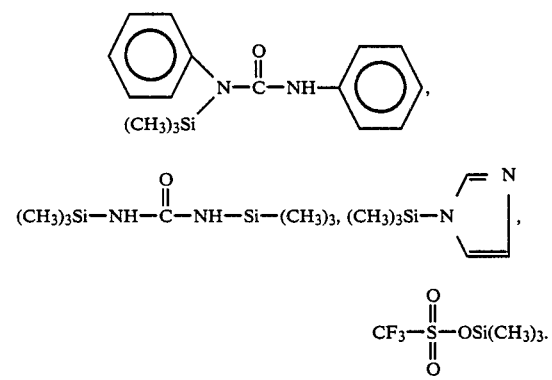

For the composition for the mastic type sealant, (CH$_3$)$_3$SiNHSi(CH$_3$)$_3$ and bis(trimethylsilyl)acetamide are preferable.

The reason why the tensile properties, particularly elongation of the cured product of the polymer composition of the invention are improved by the addition of compound having one silanol group in a molecule to the organic polymer having at least one reactive silicone group in a molecule may be explained as follows:

The compound having one silanol group which is present or formed in the compositinn reacts with the reactive silicone group of the organic polymer and caps it. This results in decrease of the number of the cross linking sites and thus increase of the molecular weight between the cross linking sites which leads to the improvement of the elongation of the cured product of the polymer composition of the invention.

The amount of the compound having one silanol group in the molecule or the compound which reacts with water or moisture to form the compound having one silanol group in a molecule (hereinafter referred to as a "compound having the silanol group") is preferably from 0.1 to 10 parts by weight, specifically from 0.5 to 5.0 parts by weight based on 100 parts by weight of the organic polymer (A).

The compound having the silanol group can be added to the organic polymer by various manners. The first manner comprises simply adding the compound to the organic polymer by adjusting conditions such as temperature and agitation so that the former is homogeneously dispersed or dissolved in the latter. Optionally, a dispersing agent such as a surfactant may be used. The second manner comprises adding the compound to the organic polymer just before the final product is used. For example, when the sealing material is supplied as a two-pack type one, the compound is added as a third component together with a curing agent to the organic polymer. The third manner comprises reacting the compound with the organic polymer optionally in the presence of a condensation caralyst. In case of the compound which reacts with water or moisture to form the compound having one silanol group in a molecule, a required amount of water is also used. This reaction is preferably carried out at a high temperature under reduced pressure to remove volatile materials. Specific examples of the silanol condensation catalyst are titanates (e.g. tetrabutyl titanate, teterapropyl titanate, etc.), organic tin compounds (e.g. dibutyltin dilaurate, dibutyltin maleate, dibutyltin diacetate, tin caprilte, tin naphthenate, etc.), lead caprilate, amine compounds (e.g. butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)-phenol, morpholine, N-methylmorpholine, 1,3-diazabicyclo[5.4.6]- undecene-7, and their salts with carboxylic acids, etc.), a low molecular weight polyamide prepared from a polybasic acid and an excess amount of polyamine, a reaction product of an epoxy compound and an excess amounr of polyamine, a silanol condensation catalyst such as a silane coupling agent having an amino group (e.g. γ-aminopropyltrimethoxysilane, N-(β-aminoethyl)aminopropylmethyldimethoxysilane, etc), and a mixture thereof.

The polymeric composition of the present invention is used as an adhesive, a pressure sensitive adhesive, a coating material, a sealing material, a water-proof material, a spray covering material, a templating material, a casting material, etc., and particularly useful as the sealing material and the pressure sensitive adhesive. When the polymer is used in the above applications, a conventionally used additive is optionally added. Examples of the additive are a reinforcement or non-reinforcement filler (e.g. white carbon, carbon black, calcium carbonate, titanium oxide, talc, asbestos, glass fiber, etc.), a plasticizer, an anti-oxidant, an ultraviolet light absorber, a pigment, a flame retardant, etc.

When the polymer of the invention is used as the sealing material, optionally added is a plasticizer, a filler, a reinforcement, an antisagging agent, a colorant, an anti-aging agent, an adhesion promoting agent, a property modifier, etc. Specific examples of the plasticizer are phtahlates (e.g. dibutyl phthalate, diheptyl phthalate, di(2-ethylhexyl) phthalate, butyl benzyl phthalate, butyl phthalyl butylglycolate, etc.), non-aromatic dibasic acid esters (e.g. dioctyl adipate, dioctyl sebacate, etc.), esters of polylkylene glycol (e.g. diethylene glycol dibenzoate, triethylene glycol dibenzoate, etc.), phosphates (e.g. tricresyl phosphate, tributyl phosphate, etc.), chlorinated paraffins, hydrocarbon oils (e.g. alkyldiphenyl, partially hydrogenated terphenyl, etc.), which are used alone or as a mixture thereof. The plasticizer may be added in the course of the polymerization. Specific examples of the filler or reinforcement are heavy or light calcium carbonate, calcium carbonate surface of which is treated with an aliphatic acid, a resin acid, a cationinc surfactant, an anionic surfactant, etc., magnesium carbonate, talc, titanium oxide, barium sulfate, alumina, metal powder (e.g. aluminium, zinc and iron powder), bentonate, kaolin clay, fumed silica, silica powder, and carbon black. When a transparent filler or reinforcement such as fumed silica is used, a transparent sealing material is prepared. Specific examples of the antisagging agent are hydrogenated caster oil, and metal soap such as calcium stearate, aluminium stearate and barium stearate. The thickening agent may not be used depending on the end use or the compounding of the filler or reinforcement. As the colorant, conventional organic or inorganic pigment or dye may be used. Specific examples of the property modifier are silane coupling agents such as alkylalkoxy silanes (e.g. methyltrimethoxysilane, dimethyldimethoxysilane, trimethylmethoxysilane, n-propyltrimethoxysilane, etc.), alkylisopropenoxysilanes (e.g. dimethyldiisopropenoxysilane, methyltriisopropenoxysilane, γ-glycidoxypropylmethyldiisopropenoxysilane, etc.), alkoxysilane having a functional group(s) (e.g. γ-glycidoxypropylmethyldimethoxysilane, γ-glycidoxypropyltrimethoxysilane, vinyltrimethoxysilane, vinyldimethylmethoxysilane, γ-aminopropyltrimathoxysilane, N-(8-aminoethyl)aminopropylmethyldimethoxysilane, γ-mercaptopropyltrimethoxysilane, γ-mercaptopropylmethyldimethoxysilane, etc.), silicone varnish, polysiloxanes, etc. Addition of the property modifier can increase or decrease the hardness of the cured polymer. The adhesivity promoting agent is not necessarily added since the polymer of the invention per se has adhesivity to surface of glass, ceramics, metals etc., or the polymer can be adhered to various surfaces by the use of a primer. Specific examples of the adhesivity promoting agent are epoxy resins, phenol resins, silane coupling agents, alkyl titanates, aromatic polyisocyanate, etc. Specific examples of the curing catalyst are the silanol condensation catalysts described above.

To improve processability of the polyemr and/or to reduce the viscosity of the polymer, a solvent may be used. Specific examples of the solvent are aromatic hydrocarbons (e.g. toluene, xylene, etc. ester (e.g ethyl acetate, butyl acetate, amyl acetate, cellosolue acetate, etc.), and ketones (e.g. methyl ethyl ketone, methyl isobutyl ketone, diisobutyl ketone, etc.). The solvent may be used in the polymerization step.

The anti-aging agent is not necessarily added to the polymer. When used, the antioxidant or the ultraviolet absorbing agent is preferably used.

The sealing material comprising the polymer composition of the invention may be formulated as a moisture curing one-pack type one by compounding all the components and stored in a sealed state. Alternatively, the sealing material may be formulated as a two-pack type one consisting of the polymer composition and a curing mixture containing the curing catalyst, the filler, the plasticizer, water and other suitable components except the polymer, which are mixed in use.

In case of the one-pack type sealing material, since all the components are beforehand compounded, preferably, any component including water or moisture should be dehydrated before compounding, or the components are compounded with removing water or moisture, for example, under reduced pressure.

In case of the two-pack type one, since the polymer composition does not contain any curing catalyst, either the polymer composition and the curing mixture may contain a slight amount of water or moisture. However, for longer storage of the sealing material, it is preferably dehydrated. Solid components such as powder may be heated to dehydrate, and liquid components may be dehydrated under reduced pressure or with a desiccant such as synthetic zeolites, active alumina and silica gel. Alternatively or in addition, water or moisture can be removed by adding a small amount of isocyanate compound to react the isocyante groups with water or moisture. In addition, storage stability of the sealing material is improved by the addition of lower alcohols (e.g. methanol, ethanol, etc.) or alkoxysilanes (e.g. n-propyltrimethoxysilane, vinylmethyldimethoxysilane, γ-mercaptopropylmethyldimethoxysilane, γ-glycidoxypropyltrimethoxysilane, etc.).

When the polymer composition of the invention is to be used as the pressure sensitive adhesive, the same curing catalyst, the anti-aging agent, the plasticizer, the reinforcement, the property modifier, the solvent, etc. as used in the sealing material may be used. For certain some final uses, the pressure sensitive adhesive may contain a conventionally used additive such as rosin ester resin, phenol resin, xylene resin, xylene-phenol resin, cumarone resin, petroleum resin including aromatic, resin/aromatic copolymer and alicyclic one, terpene resin, terpene-phenol resin, low molecular weight polystyrene, etc. The pressure sensitive adhesive according to the present invention may be used in the same way as the conventional pressure sensitive adhesive and is applied on a substrate such as a tape, a sheet, a label and a foil. For example, the pressure sensitive adhesive according to the present invention as such or in the form of a solution, an emulsion or a hot-melt type may be applied on a film of a synthetic resin or a modified natural material, paper, fabrics, metal foils, metallized plastic foils, asbestos or glass fiber fabrics and cured at a room temperature or an elevated temperature with exposure to water or moisture.

The invention will be hereinafter explained further in detail by following Examples.

EXAMPLE 1

Preparation of a vinyl polymer having reactive silicone groups

To a mixture of n-butyl acrylate (128 g, 1 mole), vinyltrimethoxysilane (0.74 g, 0.005 mole) and γ-mercaptopropylmethyldimethoxysilane (1.44 g, 0.008 mole), α,α'-azobisisobutyronitrile (0.3 g) was dissolved with stirring. A part of the solution (30 g) was charged in a 300 ml four-necked flask equipped with a condenser and a dropping funnel the interior of which flask was replaced with nitrogen and heated at 80° C. in a nitrogen atmosphere. After several minutes, the exothermic polymerizaion was initiated and the viscosity of the solution increased. After the generation of heat was calmed down, the residual solution was dropwise added over about 3 hours. After 15 and 30 minutes from the completion of the addition of the solution, a 20% by weight solution of α,α'-azobisisobutyronitrile in acetone (each 60 μl) and the polymerization was continued at 80° C. with stirring for additional 30 minutes to obtain a colorless transparent viscous polymer. Viscosity (23° C.), 890 poise. Amount of the residual monomers (gas chromatographic analysis), 1.5%. Average molecular weight (gel permeation chromatographic (GPC) analysis), 21,000.

EXAMPLES 2-7

Preparation of a vinyl polymer having reactive silicone groups

In the same manner as in Example 1 but using the components shown in Table 1, the polymerization was carried out to obtain the polymer, the viscosity, the residual monomer amount and the average molecular weight of which are shown in Table 1.

In Table 1, the abbreviations have following significances:

BA: Buthyl acrylate
2EHA: 2-Ethylhexyl acrylate
VAc: Vinyl acetate
HDDA: $CH_2=CHCOO(CH_2)_6OCOCH=CH_2$
TMPA: $(CH_2=CHCOO)_3CCH_2CH_3$

NPGDA:

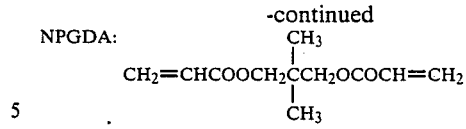

FA.731A:

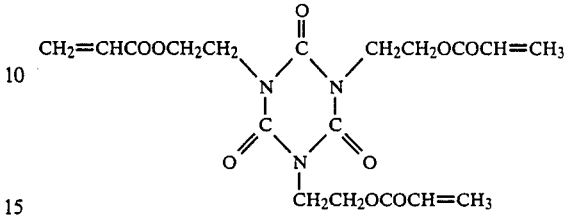

MAPDMS:

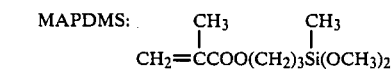

MAPTMS:

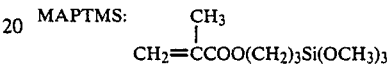

MPDMS: γ-Mercaptopropylmethyldimethoxysilane
MPTMS: γ-Mercaptopropyltriethoxysilane
AIBN: α,α'-Azobisisobutyronitrile.

TABLE 1

| Example | 2 | 3 | 4 | 5 | 6 | 7 |
|---|---|---|---|---|---|---|
| Primary monomer (g) | BA (50) | BA (100) | BA (128) | BA (128) | BA (128) | BA (128) |
| Other monomer (g) | 2EHA (50) MAPDMS (0.50) | VAc (20) MAPTMS (0.50) | HDDA (1.70) | TMPA (1.78) | NPGDA (2.12) MAPDMS (0.70) | FA.731A (4.24) |
| Chain Transfer agent (g) | MPTES (5.50) | MPDMS (3.50) | MPDMS (1.70) | MPDMS (3.25) | MPDMS (3.61) | MPDMS (4.93) |
| Initiator (g) | AIBN (0.35) | AIBN (0.35) | AIBN (0.35) | AIBN (0.35) | AIBN (0.35) | AIBN (0.35) |
| Viscosity at 23° C.*1 (poise) | 180 | 230 | 670 | 350 | 250 | 430 |
| Residual monomer (%) | 1.5 | 1.7 | 1.6 | 2.1 | 1.8 | 1.3 |
| Average molecular weight | 6,000 | 8,000 | 15,000 | 10,000 | 8,000 | 12,000 |

Note
*1Measured by a B-type viscometer.

EXAMPLE 8-14

Composition comprising a vinyl polymer and a silanol compound

To the organic polymer produced in Example 1 (30 g), triphenylsilanol (0.43 g) was added and heated at 90° C. for 2 hours with stirring to obtain a homogeneous transparent mixture. To the mixture, a heated product of dibutyltin oxide and di-2-ethylhexyl phthalate in a molar ratio of 2:1 (NO918 (trade name) manufactured by Sankyo Organic Chemicals) (0.9 g) was added and thoroughly mixed up. After centrifugally deaerated (3,000 rpm x 10 min.), the mixture was poured in a polyethylene made mold (11×8×0.3 mm) and cured at a room temperature for 3 days followed by at 50° C. for 4 days to obtain a colorless transparent rubbery sheet.

From this sheet, a No. 3 dumbbell (JIS K 6301) was cut out and subjected to a tensile test by pulling it at a rate of 200 mm/min. by means of an autograph. Elongation and tensile strength at break are shown in Table 2.

The same test was repeated on each polymer produced in Examples 2-7.

For comparison, a cured product not containing any silanol compound was subjected to the same tensile test.

All the results are shown in Table 2, in which values for elongation and tensile strength at break in parenthses are those of comparison.

TABLE 2

| Example No. | 8 | 9 | 10 | 11 | 12 | 13 | 14 |
|---|---|---|---|---|---|---|---|
| Polymer (Example No.) | 1 | 2 | 3 | 4 | 5 | 6 | 7 |
| Amount of triphenyl-silanol (g) | 0.43 | 0.39 | 0.29 | 0.38 | 0.45 | 0.71 | 0.24 |
| Rate[*1] of triphenyl-silanol (%) | 50 | 20 | 25 | 40 | 40 | 50 | 15 |
| $E_B$[*2] (%) | 500 (260) | 300 (120) | 350 (150) | 450 (190) | 520 (240) | 350 (110) | 250 (130) |
| $T_B$[*3] (Kg/cm²) | 2.3 (2.5) | 2.0 (2.1) | 2.3 (2.3) | 1.9 (2.1) | 1.8 (1.8) | 2.0 (2.2) | 1.8 (1.9) |

Note
[*1] % by mole of triphenylsilanol based on the amount of the silane-containing compound used in the production of the organic polymer.
[*2] Elongation at break.
[*3] Tensile strength at break.

EXAMPLE 15-17

Composition comprising a vinyl polymer and a monohydric silanol compound

In the same manner as in Example 8 but using a silanol compound shown in Table 3 in place of triphenylsilanol, the cured product was produced and its tensile properties were measured. The results are shown in Table 3 in which "Ph" stands for "phenyl group".

TABLE 3

| Example No. | 15 | 16 | 17 |
|---|---|---|---|
| Silanol compound (g) | $(CH_3)_3SiOH$ (0.09) | $(CH_3CH_2)_3SiOH$ (0.09) | $Ph_2—SiOH$ <br> $\quad\;\; \mid$ <br> $\quad\;\; CH_3$ (0.36) |
| Rate of silanol compound (%) | 30 | 20 | 50 |
| $E_B$ (%) | 390 | 400 | 480 |
| $T_B$ (Kg/cm²) | 2.4 | 2.5 | 2.0 |

EXAMPLES 18-20

Composition comprising a vinyl polymer and a compound which forms a silanol compound In the same manner as in Example 8 but using a compound which reacts with water to form a compound having a silanol group in a molecule shown in Table 4 in place of triphenylsinanol, the cured product was produced and its tensile properties were measured. The results are shown in Table 4 in which "Me" stands for "methyl group".

TABLE 4

| Example No. | 18 | 19 | 20 |
|---|---|---|---|
| Silanol compound (g) | $Me_3SiNSiMe_3$ <br> $\quad\quad \mid$ <br> $\quad\quad H$ (0.16) | $MeCOSiMe_3$ <br> $\quad\;\; \parallel$ <br> $\quad\;\; NSiMe_3$ (0.27) | $MeCONSiMe_3$ <br> $\quad\quad\quad \mid$ <br> $\quad\quad\quad H$ (0.22) |
| Rate[*1] of silanol compound (%) | 30 | 40 | 50 |
| $E_B$ (%) | 420 | 480 | 480 |

TABLE 4-continued

| Example No. | 18 | 19 | 20 |
|---|---|---|---|
| $T_B$ (Kg/cm²) | 2.4 | 2.2 | 2.2 |

EXAMPLE 21

Composition comprisinq an alkyleneoxide polymer having reactive silicone groups and a silanol compound To a propyleneoxide polymer having reactive silicone terminal groups 80% of which are $(CH_3O)_2$-$Si(CH_3)CH_2CH_2CH_2O$—(100 g. Average molecular weight, 8,200), triphenylsilanol (1.5 g) was added and heated at 90° C. for 2 hours with stirring to obtains a homogeneous transparent mixture. To the mixture, glue type calcium carbonate treated with a fatty acid (150 g), dioctyl phthalate (65 g), hydrogenated caster oil (6 g), styrenated phenol (1 g), tin octylate (3 g) and laurylamine (1 g) were added and kneaded by passing the mixture through three roll paint rolls three times According to JIS A 5758, a II type test piece with an H shape (substrate: anodic aluminum oxide, primer: APZ-730 manufactured by Nippon Unicar) was produced and examined for its tensile properties. The results are shown in Table 5.

TABLE 5

|  | Example 21 | Comparative[*2] |
|---|---|---|
| $M_{50}$ [*1] (kg/cm²) | 1.0 | 3.3 |
| $T_B$ (kg/cm²) | 5.7 | 7.8 |
| $E_B$ (%) | 780 | 320 |
| Failure | Cohesive failure | |

Note
[*1] Modulus at 50% elongation.
[*2] Without triphenylsilanol.

EXAMPLES 22-24

Composition comprising an alkyleneoxide polymer and a silanol compound

In the same manner as in Example 21 but using a silanol compound as shown in Table 6 in place of triphenylsilanol, the cured product was produced and its tensile properties were measured. The results are shown in Table 6 in which "Me", "Et" and "Ph" stand for "methyl group", "ethyl group" and "phenyl group", respectively.

TABLE 6

| Example No. | 22 | 23 | 24 |
|---|---|---|---|
| Silanol compound (g) | $(Me)_3SiOH$ (0.5) | $(Et)_3SiOH$ (0.7) | $(Ph)_2SiOH$ <br> $\quad\;\; \mid$ <br> $\quad\;\; Me$ (1.2) |
| $M_{50}$ (kg/cm²) | 1.5 | 1.4 | 1.1 |
| $T_B$ (kg/cm²) | 6.6 | 6.5 | 6.7 |
| $E_B$ (%) | 650 | 680 | 720 |
| Failure |  | Cohesive failure |  |

EXAMPLES 25-27

Composition comprising an alkyleneoxide polymer and a compound which forms a monohydric silanol compound In the same manner as in Example 21 but using a compound which reacts with water to form a compound having a silanol group in the molecule shown in Table 4 in place of triphenylsinanol,, the cured product was produced and its tensile properties were measured.

The results are shown in Table 7 in which "Me" stands for "methyl group".

TABLE 7

| | Example No. | | |
|---|---|---|---|
| | 25 | 26 | 27 |
| Compound (g) | (Me)$_3$Si\NH/(Me)$_3$Si | (Me)$_3$SiO\MeC/\NSi(Me)$_3$ | MeC—NSi(Me)$_3$ ‖ \| O H |
| | (1.5) | (1.5) | (1.5) |
| M$_{50}$ (kg/cm$^2$) | 0.8 | 0.8 | 1.0 |
| T$_B$ (kg/cm$^2$) | 5.2 | 5.8 | 6.3 |
| E$_B$ (%) | 750 | 900 | 820 |
| Failure | | Cohesive failure | |

EXAMPLE 28

Preparation of a graft polymer having reactive silicone groups

To a reactor, a propyleneoxide polymer having terminal groups 80% of which are (CH$_3$O)$_2$-Si(CH$_3$)CH$_2$CH$_2$CH$_2$O— (100 g. Average molecular weight, 8,200) was charged and evacuated. After replacing the interior of the reactor with nitrogen, the temperature was raised to 90° C. with stirring. Then, a mixture of n-butyl acrylate (96.9 g), γ-mathacryloxypropylmethyldimethoxysilane (0.3 g)'γ-mercaptopropylmethyldimethoxysilane (1.6 g) and AIBN (0.5 g) was dropwise added in a nitrogen atmosphere over 2 hours. AIBN (each 0.025 g) dissolved in 4 time weight acetone was added after 15 and 30 minutes from the completion of the addition of the mixture. Thereafter, the reaction was continued for further 30 minutes with stirring to obtain a transparent pale yellow viscous liquid polymer. Viscosity (23° C.), 490 poise. Amount of the residual monomer, 0.7%.

EXAMPLES 29 and 30

Composition of a grafted polymer having reactive silicone groups and a silanol compound To a polymer having at least one reactive silicone group in a molecule (100 g), glue type calcium carbonate treated with a fatty acid (120 g), titanium oxide (30 g), butyl benzyl phthalate (60 g), hydrogenated caster oil (6 g) and styrenated phenol (1 g) were added and kneaded by passing the mixture through three roll paint rolls three times. Then, to the kneaded compound, a curing catalyst mixture of tin octylate (3 g), laurylamine (1 g) and a silicone compound shown in Table 8 was added and thoroughly mixed,up.

According to JIS A 5758, a II type test piece with an H shape (substrate: glass, primer: APZ-730 manufactured by Nippon Unicar) was produced and examined for its tensile properties. The results are shown in Table 8 in which "Ph" and "Me" stands for "phenyl group" and "methyl group", respectively.

TABLE 8

| | Example 29 | Example 30 | Comparative |
|---|---|---|---|
| Silicone compound (g) | (Ph)$_3$SiOH (1.5) | (Me)$_3$Si\NH/(Me)$_3$Si | None |
| M$_{50}$ (kg/cm$^2$) | 1.0 | 0.9 | 1.7 |
| T$_B$ (kg/cm$^2$) | 5.3 | 5.2 | 5.4 |

TABLE 8-continued

| | Example 29 | Example 30 | Comparative |
|---|---|---|---|
| E$_B$ (%) | 410 | 450 | 290 |
| Failure | | Cohesive failure | |

EXAMPLE 31

Tack free sealing material comprising an alkyleneoxide polymer

To a propyleneoxide polymer having reactive silicone terminal groups 80% of which are (CH$_3$O)$_2$-Si(CH$_3$)CH$_2$CH$_2$CH$_2$O—(100 g. Average molecular weight, 8,200), glue type calcium carbonate treated with a fatty acid (120 g), titanium oxide (30 g), dioctyl phthalate (60 g), hydrogenated caster oil (6 g), styrenated phenol (1 g) were added and kneaded by passing the mixture through three roll paint rolls three times. To the kneaded compound, a curing catalyst mixture of tin octylate (3 g) and laurylamine (1 g) and bis(trimethylsilyl)acetamide (3 g) was added and thoroughly mixed up.

According to JIS A 5758, a II type test piece with an H shape (substrate: glass, primer: APZ-730 manufactured by Nippon Unicar) was produced and aged at 25° C., 50% RH for one week. Although the surface of the cured product was tack free, the inner portion of the product was semi-cured so that a spacer could not be removed. Without removing the spacer, the product was further aged at 50° C. for one week, but the inner portion was semi-cured. Further, the product was kept in a Geer type oven kept at 90° C. for one month but the inner portion was still semi-cured and the spacer could not be removed.

In the same manner as described above but using hexamethylsilazane (5 g) in place of bis(trimethylsilyl)acetamide, a cured product was prepared. Similarly, the surface of the cured product was tack free but the inner portion was semi-cured.

Therefore, the composition of the present invention is preferably used as a mastic-type sealant.

EXAMPLE 32

Composition comprising a reaction product of an alkyleneoxide polymer and a silanol compound To a propyleneoxide polymer having terminal groups 80% of which are (CH$_3$O)$_2$Si(CH$_3$)CH$_2$CH$_2$C-H$_2$O—(100 g. Average molecular weight, 8,200), triphenylsilanol (1.5 g) was added and stirred at 90° C. for 1 hour in a nitrogen atmosphere. After triphenylsilanol was homogeneously dissolved, dibutyltin dilaurate (0.1 g) was added and evacuated at 90° C. under reduced pressure for about 5 hours. After cooling, a curing catalyst mixture of tin octylate (3 g) and laurylamine (1 g) was added and thoroughly mixed up. After deaeration, the mixture was poured in a 3 mm thick frame and kept standing at a room temperature for one day followed by aging at 50° C. for 2 days to form a 3 mm thick sheet. From this sheet, a No. 3 dumbbell (JIS K 6301) was cut out and subjected to a tensile test by pulling it at a rate of 500 mm/min. by means of an autograph. Tensile strength at break, 4.7 kg/cm2 Elongation at break, 760%.

With the polymer which was not treated with triphenylsilanol, the cured product had tensile strength of 5.6 kg/cm$^2$ and elongation of 260%.

What is claimed is:

1. A moisture curable polymer composition comprising
   (A) an organic polymer having (i) at least one reactive silicon-containing group in a molecule which group is capable of effecting a condensation reaction in the presence of moisture or a cross linking agent and represented by the formula:

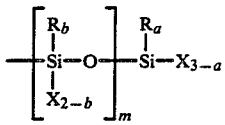

wherein R is a $C_1$–$C_{20}$ alkyl or cycloalkyl group, a $C_6$–$C_{20}$ aryl group, a $C_7$–$C_{20}$ aralkyl group or a triorganosiloxy group of the formula:

(R')$_3$SiO— wherein R' is, the same or different, a $C_1$–$C_{20}$ monovalent hydrocarbon group, X is a hydroxyl group or, the same or different, a hydrolyzable group, a is 0, 2, or 3, b is 0, 1 or 2, and m is an integer of 0 to 18, and (ii) said organic polymer having a backbone selected from the group consisting of a backbone comprising units derived from an acrylate or methacrylate monomer of the formula:

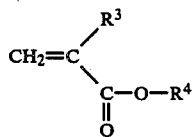

wherein $R^3$ is a hydrogen atom or a methyl group and $R^4$ is a $C_1$–$C_{20}$ $C_{20}$ alkyl group and a backbone comprising units of the formula:

—$R^{11}$—O— wherein $R^{11}$ is a $C_1$–$C_8$ organic divalent group, and
   (B) a compound selected from the group consisting of a compound having one silanol group in a molecule and a compound which reacts with water to form a compound having one silanol group in a molecule.

2. A moisture curable composition according to claim 1, wherein the hydrolyzable group X is an lakoxy group.

3. A moisture curable composition according to claim 1, wherien the organic polymer (A) is a poly alkyleneoxide having a backbone comprising units of the formula:

—$R^{11}$—O— wherein $R^{11}$ is a $C_1$–$C_8$ organic divalent group.

4. A moisture curable composition according to claim 1, wherein the component (B) is a compound selected from the group consisting of $(CH_3)_3SiNHSi(CH_3)_3$ and bis(trimethylsilyl)acetamide.

5. A moisture curable composition according to claim 1, wherein the organic polymer (A) has a backbone of a polymer comprising units derived from an acrylate or methacrylate monomer of the formula:

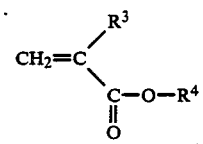

wherein $R^3$ is a hydrogen atom or a methyl group and $R^4$ is a $C_1$–$C_{20}$ alkyl group.

6. A moisture curable composition according to claim 5, wherein the organic polymer (A) is one produced by polymerizing the acrylic or methacrylic monomer (II) in the presence of at least one compound selected form the group consisting of:
   (1) an ethylenically unsaturated monomer having a reactive silicone group of the formula:

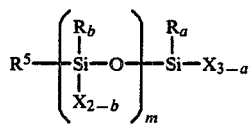

p1 wherein R, X, a, b, and m are the same as defined above and $R^5$ is an organic group having an ethylenically unsaturated group,
   (2) an initiator having a reactive silicone group of the formula:

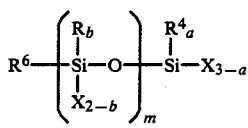

wherein R, X, a, and m are the same as defined above and $R^6$ is an organic group containing an azo or peroxy group, and
   (3) a chain transfer agent having a reactive silicone group of the formula:

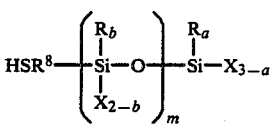

or

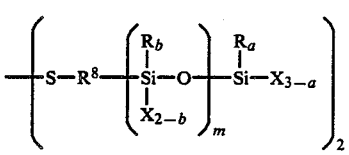

wherein R, X, a, b and m are the same as defined above and $R^8$ is a $C_1$–$C_{18}$ divalent organic group.

* * * * *